Sept. 25, 1956    L. MERKER    2,764,490
REFRACTIVE MATERIAL
Filed Feb. 2, 1953
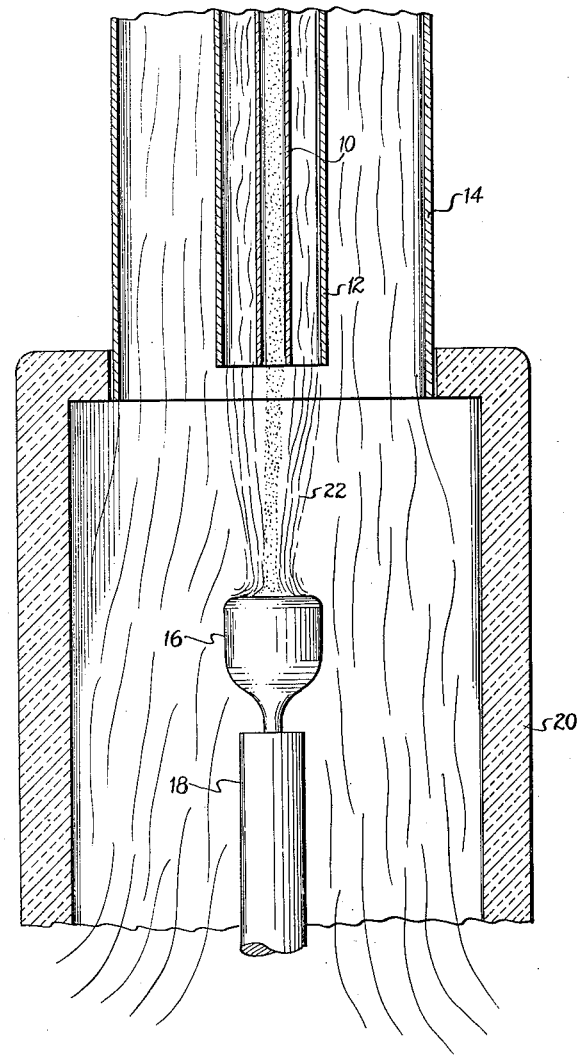
INVENTOR
LEON MERKER
BY *Charles F. Kaegebehn*
ATTORNEY

United States Patent Office 2,764,490
Patented Sept. 25, 1956

2,764,490
REFRACTIVE MATERIAL

Leon Merker, New York, N. Y., assignor to National Lead Company, New York, N. Y., a corporation of New Jersey Application February 2, 1953, Serial No. 334,704

7 Claims. (Cl. 106—42)

This invention relates to monocrystalline strontium titanate and to methods of making and treating monocrystalline strontium titanate.

Monocrystalline strontium titanate is characterized by a high index of refraction (about 2.4) and a low reciprocal relative dispersion or $\nu$ value (about 13). Large single crystals of strontium titanate may be made which are clear, transparent and glass-like and such crystals have important optical applications because the refractive index is substantially higher and the reciprocal relative dispersion substantially lower than those of the densest flint glasses. Whether clear or colored, the crystals have important gem stone and other applications because of their high refraction and dispersion.

One broad use of optical materials having high refractive indices and high dispersion is in the manufacture of lenses and prisms. For example, materials having a high index of refraction are utilized in the construction of optical systems such as telescopic or high magnification microscopic objectives. Furthermore combinations of optical materials which individually possess widely variant optical properties are used to prepare achromatic lenses. High dispersion qualities are also useful for making prisms and the like. Highly refractive single crystal material is also useful for the preparation of ornamental objects such as gem stones. Synthetic gems of various types and colors are in great demand for both personal adornment and industrial uses.

An object of this invention therefore is to provide a method for producing monocrystalline material which possesses exceedingly high index of refraction with a high dispersion or relatively low $\nu$ value. A further object is to provide a method for producing a glass-like material suitable for manufacture of lenses of high magnifying power. A still further object is to provide a method for producing monocrystalline material having a high index of refraction which is simple and economical to manufacture. Further to provide as a new article of manufacture a monocrystalline mass which can be cut and polished in the form of a gem. Further to provide for a monocrystalline mass having a color ranging from either substantially water-white or yellow through blue to blue black and to provide a method for producing the same. These and other objects will become apparent from the following more complete description of the invention.

Broadly this invention contemplates a method for the preparation of a monocrystalline mass of strontium titanate which comprises periodically introducing powdered strontium titanate into a stream of oxygen which is surrounded by a stream of hydrogen and forming a flame having a central oxygen cone, melting the powdered strontium titanate in said flame, crystallizing the molten material adjacent the end of the oxygen cone, and maintaining the flame about the crystallized material to form a monocrystalline mass of strontium titanate in the form of a boule. The flame should be of temperature between about 2080° C. and about 2150° C.

This invention also contemplates a method for treating the so-formed strontium titanate boule which comprises heating said boule in an oxidizing atmosphere at temperature from about 650° C. to about 1700° C. to produce a substantially white color.

This invention further contemplates a method for producing a single crystal of strontium titanate having a color ranging from substantially water white or yellow through blue to blue black which comprises periodically introducing into an oxygen-hydrogen flame a powdered composition consisting of strontium titanate and an effective amount up to about 3.0% of at least one substance selected from the group consisting of oxidic compound of molybdenum, oxidic compound of tungsten and oxidic compound of uranium, said flame being of temperature between about 2080° C. and about 2150° C. and crystallizing the melted material as a monocrystalline mass in the form of a boule and subsequently subjecting the boule to an oxidizing treatment at temperature from about 650° C. to about 1700° C. to produce the desired color.

It has been found that amounts of addition agents as low as about 0.005% are effective in changing the color of the strontium titanate crystal.

The term strontium titanate is intended to embrace both pure and substantially pure $SrTiO_3$, the latter which contains impurities or coloring or modifying agents either present or added which are of a nature and in amount so as to not affect the monocrystalline structure nor alter the desired color of the strontium titanate material produced. In most cases the impurities are held to a minimum and ordinarily will not exceed a few tenths of a per cent and modifying or coloring agents are added in the amount necessary to produce the desired effect.

In order to prepare a monocrystalline mass by co-fusing particles of strontium titanate, it is necessary to employ high temperatures. Strontium titanate melts in the neighborhood of about 2050° C. and it is therefore preferred to use an oxygen-hydrogen flame in order to obtain the necessary temperatures without the possible introduction of impurities.

It has been found that the temperature of the flame should be maintained somewhat above the melting point of the strontium titanate feed material, i. e. about 2080° C. and preferably between about 2110° C. and about 2130° C., but should not exceed about 2150° C. because at this temperature the boule which is formed by crystallization of the molten material tends to remelt at the top and the pool of molten material formed at the top of the boule flows over. These flame temperatures may be maintained by adjusting the quantity and rates of flow of both the hydrogen and oxygen gases but it is important that the flame be kept as constant and quiet as possible.

The preferred apparatus used in the instant invention is similar in its general construction to that shown in abandoned application Serial No. 286,853, filed May 9, 1952, by Charles H. Moore, Jr., et al. and in Belgian Patent No. 491,522. The principal differences in the present preferred apparatus is in the relation of the burner and chamber and the manner in which the gases are introduced. These differences are illustrated in the drawing.

In the apparatus shown in the drawing, the burner comprises three substantially concentric tubes 10, 12 and 14. The powdered strontium titanate is introduced through the center tube 10 with a portion of the oxygen and the remainder of the oxygen is introduced through the intermediate tube 12. The hydrogen is introduced through the outer tube 14 which may be slightly longer than the tubes 10 and 12. The boule 16 is formed on a pedestal 18 of suitable refractory material such as firebrick or zirconia and, as the boule grows, the pedestal 18 is lowered so that the top of the boule always remains at about the same location in the flame.

The boule 16 and top of the pedestal 18 are surrounded by a chamber 20 of firebrick or the like and this chamber preferably engages the lower end of the outer tube 14. The gases are preferably fed at such rates that the flame fills and extends through the entire chamber 20 and in this way the temperature and other conditions around the boule are kept substantially constant. It has been found that smaller flames may be unsteady due to currents within the chamber and variations in the flame may cause damage to the boule.

It has been found satisfactory to introduce a minor portion of the oxygen through pipe 10 with the powdered material and the major portion of the oxygen through pipe 12. An excess of hydrogen is introduced through the pipe 14 to provide the proper temperature and large flame. In one burner the oxygen in the inner pipe 10, the oxygen in the intermediate pipe 12 and the hydrogen in the outer pipe 14 are introduced in the proportions 4:5:40 respectively.

A cone 22 forms within the flame below the pipes 10 and 12 and the boule 16 is preferably positioned so that the molten top of the boule is at or near the point of the cone 22. In order to start such a single crystal to form it is desirable to first form a seed on the pedestal and then gradually build up the amount of molten material on the seed to form the crystal. Such a procedure allows the crystal to build up upon itself gradually increasing in diameter until a boule or carrot-shaped single crystal of strontium titanate is formed. The size of the orifices of the oxygen-hydrogen torch determines the size of the intensely heated zone which, in turn, determines the diameter of the carrot-shaped crystal produced.

It is preferred to employ a strontium titanate powdered material which is substantially free from objectionable or incompatible impurities which detrimentally would affect the crystal structure. Starting material should be finely divided and fairly uniform in size. For most efficient results, the strontium titanate starting material should possess an open structure with units capable of being rapidly melted. A strontium titanate starting material having an ultimate unit particle size of approximately 0.1 to 0.3 micron has proved especially satisfactory. In general, material having an average ultimate unit particle size above about 1.0 micron should be avoided because such particles do not satisfactorily fuse under the conditions of the invention. Aggregates of these small particles greater than 100 mesh should also be avoided as they do not tend to melt completely. Such a material may be conveniently prepared by first reacting titanium oxalate with strontium chloride to precipitate strontium titanium oxalate. After thoroughly washing the strontium titanate oxalate, it is heated at a temperature of at least 500° C. to remove the oxalate portion thus forming strontium titanate. Preferably this strontium titanate material is then crushed and ground to obtain finely divided material from which the strontium titanate single crystal is subsequently formed.

Using an oxygen-hydrogen burner having concentric orifices, the center orifice carrying the oxygen gas plus the powdered strontium titanate feed material entrained in the oxygen and the intermediate orifice also carrying the rest of the oxygen gas, and the outer orifice carrying the hydrogen gas, a single crystal boule of strontium titanate 1 inch long and ½ inch wide was prepared in 2 hours. The total gas flow of oxygen was 9 liters per minute, 4 liters through the center orifice and 5 liters through the intermediate orifice, while the flow of hydrogen was 40 liters per minute. These gas flows produced an overall reducing gas flame since the ratio of oxygen to hydrogen was about 1 to 4.5. This boule of strontium titanate was substantially black in color. However, upon subsequently treating the boule in an oxidizing atmosphere, such as air, for example, at temperature between 650° C. and 1700° C., the color of the boule became lighter in color until it possessed a clear, substantially colorless and transparent appearance. The time of oxidation treatment varies upon the size of the boule and the temperature employed. However it has been found that from 12 hours to 180 hours are satisfactory for producing a transparent substantially white boule. Such a transparent carrot-shaped mass of monocrystalline glass-like material may be shaped into many bodies useful for optical purposes such as, for example, cut into lens blanks suitable for preparation of lenses, prisms and other optical products; and also it may be cut into various shapes and sizes to produce many articles such as ornamental objects and novelty gems, which depend for their attractiveness and usefulness on the high refractive index of the material of which they are composed.

The index of refraction $n_D$ of the strontium titanate crystal is extremely high, i. e. about 2.4, and the reciprocal dispersion $v$ is about 13. These values will vary slightly as various types of starting materials and processing conditions are employed.

It should be noted that the strontium titanate crystal when cut into a lens has a high magnifying power and a short focal length. Such material is particularly useful for telescopic and microscopic objectives and the like, achromatic lenses and prisms and for other optical purposes which advantageously utilize wide fields, high apertures and short focal lengths. It should be noted that the index of refraction $n_D$ and reciprocal dispersion $v$ are very different from any type of known glass.

The strontium titanate boule as it is formed without employing addition agents, by the oxygen-hydrogen flame as previously stated is substantially black in color and upon a subsequent oxidizing treatment it becomes transparent and substantially white in color. It has been found that this substantially white boule, however, possesses a very slight yellow tone which is either due to its inherent properties or to possible contamination of impurities. As stated supra this invention also contemplates a preparation of a strontium titanate single crystal having either a substantially water-white color or a definite yellow color. Also a blue crystal may be prepared according to the instant invention which ranges from blue white to blue black. The substantially water-white through blue to blue-black strontium titanate crystals may be prepared by adding various amounts of oxidic compounds of tungsten to the feed material used for the preparation of the boule. In order to produce the yellow color through blue to blue black, various amounts of either oxidic compounds of molybdenum or uranium are employed in the feed material.

Substantially any oxidic compound of molybdenum, tungsten and uranium can be added to the feed material, for example, the oxide or any oxidic compounds which form oxides at the temperatures employed in the preparation of the strontium titanate boule. According to the present invention a small amount of these addition agents, for example, the oxidic compound may be mixed with the strontium titanate starting material in any convenient manner, for instance, by dry mixing. A more uniform mixture and therefore a preferred mixture may be prepared by adding compounds of the addition agent as a powder, slurry or solution, to the strontium titanium oxalate prior to the heat treatment to remove the oxalate portion. The amount of addition agent to be added to the strontium titanate starting material is very small and should not exceed about 3.0% calculated as metal oxide based on the weight of the strontium titanate.

This invention covers adding an effective amount of oxidic addition agent up to about 3.0% of the weight of the mixture. The color of the boule after the oxidizing heat treatment is dependent upon the amount of oxidic addition agent employed. It has been found that the more addition agent employed, the darker the color obtained after the oxidizing heat treatment. It has been found that when 0.005% to 0.03% of the addition agent is added to the strontium titanate feed material that either the substantially water-white color or yellow color is obtained after the oxidizing heat treatment instead of the slightly yellowish white color of the monocrystalline strontium titanate which is normally formed when no addition agents are employed. When larger amounts of the addition agent are employed a blue color is obtained upon the subsequent oxidation heat treatment, the depth of which is dependent upon the amount employed. In order to show the effects of the various amounts of addition agent upon the depth of color, the following table is presented showing the various percentage ranges which produce the various depths of color.

Table

|  | 0.005% to 0.03% | >0.03% to 0.1% | >0.1% to 3.0% |
|---|---|---|---|
| molybdenum oxide | yellow to yellow green. | deep yellow green to dark blue. | dark blue to black. |
| tungsten oxide | water-white | light blue to dark blue. | Do. |
| uranium oxide | yellow to deep yellow. | amber to deep reddish yellow. | bluish to very dark blue. |

The boules described in the above table were prepared in the following manner. Feed materials consisted of a mixture of strontium titanate and various quantities of the various oxides. These feed materials were progressively fused by passing the powdered material through the flame. The fusions were carried out at temperatures between 2110° C. and 2130° C. The boule was grown on a pedestal as the fused material was progressively crystallized. As produced, the boules were substantially black in color. They were substantially carrot-shaped and had a more or less frosted outer surface. When split, the interior surface of the pieces is vitreous and shiny. These boules were subsequently subjected to an oxidizing treatment, in either whole or split form at temperatures from 650° C. to 1700° C. for 12 to 180 hours. These oxidized crystals were then cut and polished to form beautiful gems possessing color ranging from either substantially water-white or yellow through blue to blue black.

From the above description a method has been described for producing a strontium titanate crystal which may be used for optical glass-like material. The crystal possesses exceedingly high index of refraction with an exceedingly high dispersion. The instant invention also provides a method for producing optical glass-like material which is suitable for the manufacture of lenses of high magnifying power. The process is simple and economical to employ. The instant invention further provides for a monocrystalline mass having a color ranging from substantially water-white through blue to blue-black and provides a method for producing the same.

This application is co-pending with application Serial No. 252,906, filed October 24, 1951, now U. S. Patent No. 2,628,156, issued February 10, 1953, which describes and claims monocrystalline mass of strontium titanate material, and co-pending with application Serial No. 302,261, filed August 1, 1952, now abandoned, which describes and claims the addition of tungsten oxide to the strontium titanate feed material, both of which are assigned to the same assignee as the instant application.

While this invention has been described and illustrated by the examples shown, it is not intended to be strictly limited thereto, and other modifications and variations may be employed within the scope of the following claims.

I claim:

1. Method for the preparation of a monocrystalline mass of strontium titanate in the form of a boule which comprises periodically introducing powdered strontium titanate into a stream of oxygen, surrounding said stream of oxygen with a stream of hydrogen and forming a flame having a central oxygen cone, said flame producing a temperature from about 2080° C. to about 2150° C. in said oxygen cone, melting said powdered strontium titanate at said temperature and crystallizing the molten strontium titanate adjacent the oxygen cone and recovering said crystallized strontium titanate as a monocrystalline mass.

2. Method for the preparation of a monocrystalline mass of strontium titanate in the form of a boule which comprises periodically introducing powdered strontium titanate into a stream of oxygen, surrounding said stream of oxygen with a stream of hydrogen and forming a flame having a central oxygen cone, said flame producing a temperature from about 2080° C. to about 2150° C. in said oxygen cone, melting said powdered strontium titanate at said temperature and crystallizing the molten strontium titanate adjacent the oxygen cone and recovering said crystallized strontium titanate as a monocrystalline mass, and subsequently subjecting said monocrystalline mass to an oxidizing treatment at a temperature from about 650° C. to about 1700° C.

3. Method for the preparation of a colored monocrystalline mass of strontium titanate in the form of a boule which comprises periodically introducing into a stream of oxygen a powdered mixture of strontium titanate and an amount from about 0.005% to about 3.0% by weight of a compound selected from the group consisting of molybdenum oxide, tungsten oxide and uranium oxide, surrounding said stream of oxygen with a stream of hydrogen and forming a flame having a central oxygen cone, said flame producing a temperature from about 2080° C. to about 2150° C. in said oxygen cone, melting said powdered mixture at said temperature and crystallizing the molten mixture adjacent the oxygen cone, recovering said crystallized mixture as a monocrystalline mass and subsequently subjecting said monocrystalline mass to an oxidizing treatment at a temperature from about 650° C. to about 1700° C.

4. Highly refractive glass-like material consisting essentially of a monocrystalline mass of strontium titanate and an amount from about 0.005% to about 3.0% by weight of a compound selected from the group consisting of molybdenum oxide, tungsten oxide and uranium oxide, said monocrystalline mass formed by crystallizing said mass as a boule from a melt of said mixture.

5. Composition according to claim 4 in which said monocrystalline mass of strontium titanate contains from about 0.005% to about 3.0% by weight of tungsten oxide.

6. Composition according to claim 4 in which said monocrystalline mass of strontium titanate contains from about 0.005% to about 3.0% by weight of molybdenum oxide.

7. Composition according to claim 4 in which said monocrystalline mass of strontium titanate contains from about 0.005% to about 3.0% by weight of uranium oxide.

References Cited in the file of this patent

UNITED STATES PATENTS

| 988,230 | Verneuil | Mar. 28, 1911 |
| 1,004,505 | Verneuil | Sept. 26, 1911 |
| 1,298,540 | Miller | Mar. 25, 1919 |
| 1,436,164 | Goldschmidt | Nov. 21, 1922 |
| 2,507,253 | Howatt | May 9, 1950 |
| 2,628,156 | Merker et al. | Feb. 10, 1953 |
| 2,634,554 | Barnes | Apr. 14, 1953 |

FOREIGN PATENTS

| 243,251 | Great Britain | Nov. 26, 1925 |
| 608,453 | Great Britain | Sept. 15, 1948 |
| 662,782 | France | Nov. 26, 1927 |
| 252,698 | Switzerland | Oct. 1, 1948 |

OTHER REFERENCES

"G. E. C. Journal," August 1944, pages 56–59.

Kremers: "Synthetic Optical Crystals," Ind. and Eng. Chem., November 1940, vol. 32, pages 1478–1482.